(12) United States Patent
Kim

(10) Patent No.: US 9,740,970 B2
(45) Date of Patent: Aug. 22, 2017

(54) IMAGE FORMING APPARATUS, IMAGE FORMING METHOD, PRINTING CONTROL TERMINAL DEVICE AND COMPUTER READABLE RECORD MEDIUM

(71) Applicant: Samsung Electronics Co., Ltd., Suwon-si (KR)

(72) Inventor: So-young Kim, Anyang-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 64 days.

(21) Appl. No.: 14/734,191

(22) Filed: Jun. 9, 2015

(65) Prior Publication Data

US 2016/0042257 A1    Feb. 11, 2016

(30) Foreign Application Priority Data

Aug. 8, 2014  (KR) .................. 10-2014-0102095

(51) Int. Cl.
*G06K 15/02*    (2006.01)
*G06F 3/12*     (2006.01)

(52) U.S. Cl.
CPC .......... *G06K 15/181* (2013.01); *G06F 3/121* (2013.01); *G06F 3/1236* (2013.01); *G06F 3/1247* (2013.01); *G06F 3/1292* (2013.01)

(58) Field of Classification Search
CPC ..... G06K 15/181; G06F 3/1247; G06F 3/121; G06F 3/1236; G06F 3/1292
USPC ...................................... 358/1.1, 1.15–1.17
See application file for complete search history.

*Primary Examiner* — Kent Yip
(74) *Attorney, Agent, or Firm* — Staas & Halsey LLP

(57) ABSTRACT

An image forming system is provided. One or more embodiments sets forth an image forming method using printing data that includes a plurality of strip information including a plurality of images, respectively, segmented into a plurality of regions by rendering at least one page from a file, and that includes unique information having information on respective number indicators allocated to the plurality of strip information The method includes sequentially receiving the unique information and the plurality of strip information, detecting an intended number of the plurality of strip information configuring the page based on the received unique information, determining whether all of an intended plurality of strip information configuring the page are received by comparing the intended number of the plurality of detected strip information with a detected number of the received plurality of strip information, and performing printing using the plurality of received strip information based on the determining.

20 Claims, 14 Drawing Sheets

(1)    (2)

IMAGE FORMING APPARATUS, IMAGE FORMING METHOD, PRINTING CONTROL TERMINAL DEVICE AND COMPUTER READABLE RECORD MEDIUM

CROSS-REFERENCE TO RELATED APPLICATIONS

This application claims priority from Korean Patent Application No. 10-2014-0102095, filed on Aug. 8, 2014, in the Korean Intellectual Property Office, the disclosure of which is incorporated herein by reference in its entirety.

BACKGROUND

1. Field

One or more embodiments set forth an image forming system and method, and more particularly, to an image forming system and method capable of determining whether all strip information configuring a page is received.

2. Description of the Related Art

Generally, an image forming apparatus may include an apparatus that prints printing data generated from a terminal apparatus like a computer or portable computing device on a recording sheet. An example of the image forming apparatus may include a copier, a printer, a facsimile machine, a multi function peripheral (MFP) in which functions of them are compositely implemented in one apparatus, etc.

Recently, the rapid performance improvement and function extension of mobile communication terminals, such as smart phones, have supported a function of directly transmitting printing data from the mobile communication terminal to the image forming apparatus without passing through a host apparatus like the typical personal computer, to thereby print the printing data received from the mobile communication terminal using the image forming apparatus.

However, due to limitations of resource and performance of the mobile communication terminal, printing data formats have been simplified, from those originally designed for the host apparatus, to be more suitable for the mobile communication terminal.

As an example of the simplified printing data formats, a page description language (PDL) developed as a mobile purpose may include PWG from the Printer Working Group standard organization, Ultra Fast Rendering (UFR) from Canon Co., Printer Command Language-mobile (PCLm) from Hewlett-Packard Co., and the like.

Here, PCLm has its own structure based on a grammar of a PDF format to describe printing data and thus may be suitable for printing using a mobile apparatus. However, when the mobile communication terminal initiates a printing operation and transmits the printing data to the image forming apparatus through wireless communication, for example, there is a problem in that the image forming apparatus may implement the PCLm commands and complete the printing operation without determining whether any errors occurred in the transmission, receipt, or printing of the received data. For example, there may be a situation in which there is a loss of the original printing data, e.g., due to communication disruption, etc., during the transmission of the printing data.

SUMMARY

One or more embodiments of the present invention may overcome such disadvantages, as well as or alternatively other disadvantages and provide alternative benefits not described above.

One or more embodiments provide image forming method using printing data that includes a plurality of strip information including a plurality of images, respectively, segmented into a plurality of strip regions by rendering at least one page from a file, and that includes unique information having information on respective number indicators allocated to the plurality of strip information, the image forming method including sequentially receiving the unique information and the plurality of strip information, detecting an intended number of the plurality of strip information configuring the page based on the received unique information, determining whether all of an intended plurality of strip information configuring the page are received by comparing the detected intended number of the plurality of strip information with a detected number of the received plurality of strip information, and performing printing using the plurality of received strip information based on a result of the determining.

The unique information may include positional information occupied on the page by a strip of the plurality of strip regions.

In the detecting of the intended number of the plurality of strip information, the intended number of the plurality of strip information configuring the page may be detected based on any of a final number among the number indicators sequentially allocated to the plurality of strip information and a detected number of parameters declaring positional information of the plurality of strip regions occupied on the page.

The printing data may includes a header region identifying a type of page description language (PDL) in which the printing data describes information on the page to be printed, and in the determining, it may be determined whether all of the intended plurality of strip information configuring the page are received based on the type of page description language included in the header region.

The method may further include, when the determining indicates that all of the intended plurality of strip information are not received, displaying an error that all of the intended plurality of strip information are not received.

The error may be notified to a terminal apparatus that transmitted the unique information and the strip information that is sequentially received.

In the displaying, a screen confirming whether to perform the printing using the received plurality of strip information may be displayed, and in the performing of the printing, the printing may be performed using the received plurality of strip information when a user inputs a printing command, corresponding to the displayed screen.

The method may further include, when the determining indicates that all of the intended plurality of strip information are not received, requesting a retransmission of the intended plurality of strip information from a terminal apparatus that transmitted the unique information and plurality of strip information that is sequentially received.

In the determining, the determining may be based on whether all of the intended plurality of strip information configuring the page are received within a predetermined time.

One or more embodiments may provide an image forming system using printing data that includes a plurality of strip information including a plurality of images, respectively, segmented into a plurality of strip regions by rendering at least one page from a file, and that includes unique information having information on respective number indicators allocated to the plurality of strip information, the image forming apparatus including a communication interface unit configured to sequentially receive the unique information and the plurality of strip information, a control unit configured to detect an intended number of the plurality of strip information configuring the page based on the received unique information and compare the intended number of the plurality of strip information with a detected number of the received plurality of strip information to determine whether all of an intended plurality of strip information configuring the page are received, and an image forming unit configured to perform printing using the received plurality of strip information based on a result of the determining.

The unique information may include positional information occupied on the page by a strip of the plurality of strip regions.

The control unit may detect the intended number of the plurality of strip information configuring the page based on any of a final number among the number indicators sequentially allocated to the plurality of strip information and a detected number of parameters declaring positional information of the plurality of strip regions occupied on the page.

The printing data may include a header region identifying a type of page description language (PDL) in which the printing data describes information on the page to be printed, and the control unit may determine whether all of the intended plurality of strip information configuring the page are received based on the type of page description language included in the header region.

The header region may identify the type of PDL as being at least a Printer Command Language-mobile (PCLm) format.

The system may further include a display unit, such that when the determining indicates that all of the intended plurality of strip information are not received, the display unit may be controlled to display an error that all of the intended plurality of strip information are not received.

The communication interface unit may notify a terminal apparatus that transmitted the unique information and plurality of strip information of the error.

The display unit may display a screen confirming whether to perform the printing using the received plurality of strip information, and the image forming unit may perform the printing using the received plurality of strip information when a user inputs a printing command, corresponding to the displayed screen.

The communication interface unit may transmit a signal requesting a retransmission of the plurality of strip information from a terminal apparatus that transmitted the unique information and plurality of strip information that is sequentially received, based on the result of the determining.

The control unit may determine whether all of the intended plurality of strip information configuring the page are received based on whether the plurality of strip information is received within a predetermined time.

The system may further include a printing control terminal apparatus that includes at least the control unit, and an image forming apparatus that includes at least the image forming unit.

The system may further include a mobile terminal apparatus that transmits the unique information and plurality of strip information to an image forming apparatus, with the image forming apparatus including the communication interface unit, the control unit, and the image forming unit.

One or more embodiments may provide a printing control terminal device connectable to at least one image forming apparatus, the printing control terminal device including a storage unit configured to store printing data that includes a plurality of strip information including a plurality of images, respectively, segmented into a plurality of strip regions by rendering at least one page from a file, and that includes unique information having information on respective number indicators allocated to the plurality of strip information, and a control unit configured to detect an intended number of the plurality of strip information configuring the page based on the unique information, and to compare the intended number of the plurality of detected strip information with a detected number of the plurality of strip information included in the stored printing data to determine whether all of an intended plurality of strip information configuring the page is included in the printing data.

One or more embodiments may provide a non-transitory computer readable medium including computer readable code to control at least one processing device to implement a method using printing data that includes a plurality of strip information including a plurality of images, respectively, segmented into a plurality of strip regions by rendering at least one page from a file, and that includes unique information having information on respective number indicators allocated to the plurality of strip information, wherein the method includes detecting an intended number of the plurality of strip information configuring the page based on the unique information, and comparing the intended number of the plurality of detected strip information with a detected number of the plurality of strip information included in the printing data to determine whether all of an intended plurality of strip information configuring the page is included in the printing data.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present invention will be more apparent by describing one or more embodiments of the present invention with reference to the accompanying drawings, in which.

DETAILED DESCRIPTION

Figure 1:
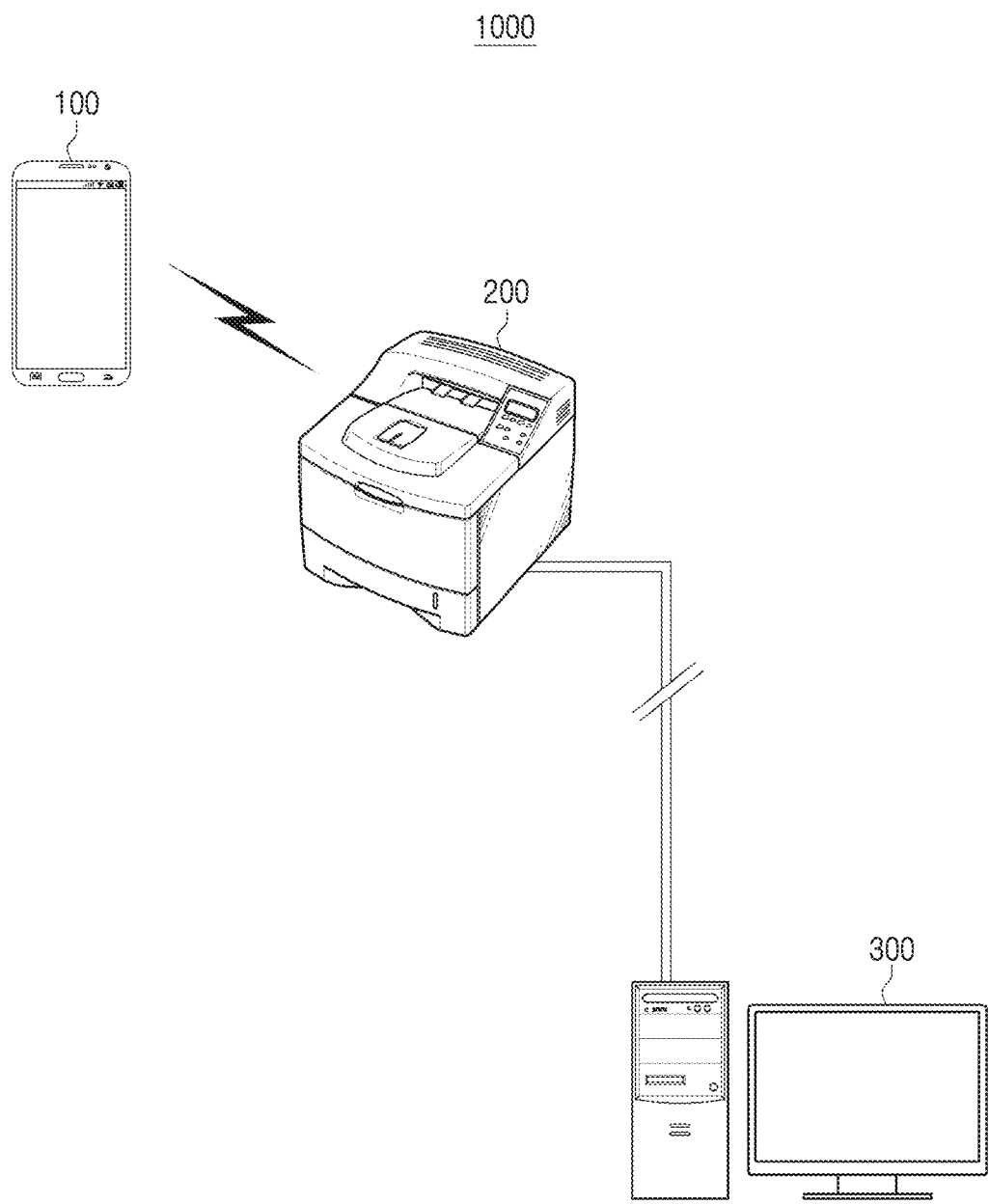
FIG. 1 is a block diagram illustrating an image forming system according to one or more embodiments of the present invention.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram illustrating an image forming system according to one or more embodiments of the present invention.

Referring to FIG. 1, an image forming system 1000 may include any or all of a mobile apparatus 100, an image forming apparatus 200, and a printing control terminal device 300, for example.

The mobile apparatus 100 may generate and store printing data and transmit the printing data to the image forming apparatus 200 to print the printing data depending on a user command of the mobile apparatus 100. In this configuration, the mobile apparatus 100 may be an information processing apparatus capable of wireless communication, like a mobile phone, a PDA, a PMP, a laptop, a tablet PC, or an UMPC. Here, as a wireless communication protocol, any and/or all the wireless communication protocols capable of data transmission like CDMA, GSM, PDC, TDMA, PHS, Wi-Fi, Wi-Fi Direct, Bluetooth, ZigBee, mmWave, or UWB may be used, as only examples.

The image forming apparatus 200 uses received printing data to perform a printing operation. Further, the image forming apparatus may inspect whether all stream information on at least one page is received from the received printing data and notify a user that the printing data are lost. A detailed description thereof will be described below with reference to FIG. 2.

The printing control terminal device 300 may also generate and store the printing data and transmit the printing data to the image forming apparatus 200 to print the printing data depending on a user printing command. In this configuration, the printing control terminal device 300 may be a general-purpose PC or a special purpose computer like a server or a work station.

The printing control terminal device 300 may include a communication interface for transmitting the printing data to the image forming apparatus 200. Further, the communication protocol supported in the communication interface may perform wireless communication similar to the mobile apparatus 100 and perform wired communication in a wired communication network like an LAN or a WAN.

Here, the printing data which are stored in the mobile apparatus 100 and the printing control terminal device 300 may be data which are converted to enable the image forming apparatus 200 to print files generated from applications like a word processor or an image edition/manufacturing tool. Further, the printing data may be a file written in accordance with on a page description language (PDL) grammar, such as the PS, XPS, PCL series formats, and in particular, may be printing data of a Printer Command Language-mobile (PCLm) format which observes a PDF grammar.

Here, the PCLm format is a paper description language (PDL) format that is simplified to enable mobile apparatuses to more easily use the printing data based on the PDF grammar. A PCLm file may be compatible in all printing apparatuses and viewers which support a version after PDF 1.4 and was manufactured to be streamable at the time of data transmission. A structure and detailed description of the PCLm format will be described below with reference to FIGS. 4 to 7.

Figure 2:
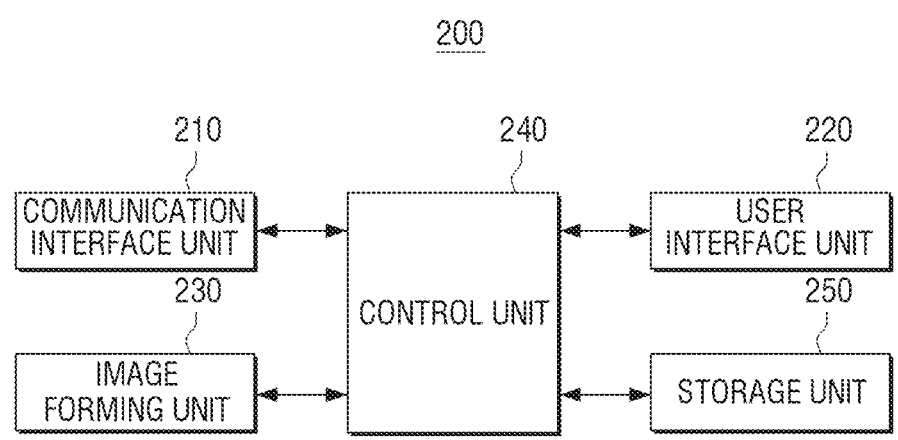
FIG. 2 is a block diagram of an image forming apparatus according to one or more embodiments of the present invention.

FIG. 2 is a block diagram of an image forming apparatus according to one or more embodiments of the present invention.

Referring to FIG. 2, the image forming apparatus 200 may include a communication interface unit 210, a user interface unit 220, an image forming unit 230, a control unit 240, and a storage unit 250, for example.

The communication interface unit 210 communicates with at least one external apparatus. In detail, the communication interface unit 210 may perform communications through not only a local area network (LAN) and an Internet network, but also a universal serial bus (USB) port and a memory card slot, as only examples.

Further, the communication interface unit 210 may render at least one page included in a file to receive a plurality of strip information including each image segmented into a plurality of regions and printing data including different unique information corresponding to the plurality of strip information, respectively. In detail, the communication interface unit 210 may sequentially receive the unique information and the plurality of strip information.

Here, the strip information means information including a long bar-shaped image, for example, in which one image formed by rendering one or a plurality of objects disposed in a page is segmented by a predetermined width. In detail, the strip information may make elements configuring a page different from an object having graphic parameters such as a font, a size, and a position on the page which may be differently applied to each independent entity such as a character, a symbol, and a picture. The strip information may be represented by information which includes each segmented image by segmenting the whole image in which one or a plurality of objects are represented graphically. As described above, when the plurality of objects are represented on the page by representing the elements configuring the page by the strip information, the plurality of objects are irregularly represented on the page based on the graphic parameters set in each object, but the strip information in which the image is segmented may be sequentially transmitted and the strip information may be rendered on the page in order, thereby more simply reproducing the page.

The communication interface unit 210 may sequentially receive the unique information corresponding to the strip information and then the strip information. Further, the communication interface unit 210 may first receive, earlier than the unique information and the strip information, a header region identifying a kind or type of page description language (PDL) that describes the page information to be printed.

If it is determined that all the strip information is not received, the communication interface unit 210 may transmit a signal requesting a retransmission of the plurality of strip information of the terminal apparatus, e.g., either of the mobile apparatus or the printing control terminal device, that transmitted the received unique information and strip information. In detail, when it occurs that a strip is not received, a screen which may enable a user to retry the transmission of the printing data may be provided. Further, the signal may be a retransmission request signal promised to the terminal apparatus transmitting the printing data.

The user interface unit 220 includes a plurality of function keys which enable a user to set or select various functions supported by the image forming apparatus 200 and displays various information provided from the image forming apparatus 200.

In particular, if it is determined that all the strip information configuring the page is not received, the user interface unit 220 may display an error screen that all the strip information is not received. In detail, the user interface unit 220 may notify a user of error detection in forms such as characters displayed on a pop-up window, a change in a screen color, and flickering of a warning light.

Further, the user interface unit 220 may be implemented by combining a monitor with a mouse and may also be implemented as an apparatus in which an input and an output are implemented together like a touch screen. In this case, the user interface unit 220 may be configured by stacking a touch sensing unit and a display unit. The touch sensing unit may be implemented as a touch sensor which may sense a user touch and a proximity sensor which may sense the proximity of the user touch and the display unit may be implemented as an LCD panel, and the like which may display various screens such as a wallpaper including various icons, a web browsing screen, an application execution screen, a screen reproducing various kinds of contents like moving pictures, and pictures, and a user interface screen.

In particular, if it is determined that all the strip information configuring the page is not received, the user interface unit 220 may receive a user command requesting the printing of the printing data, ending of a print job, or the retransmission of the printing data.

The image forming unit 230 uses the received printing data to output an image on a sheet. For example, when the image forming apparatus 200 is based on a color laser scheme, the image is printed by charging, writing, developing, transferring, and fusing processes as an image forming process. In this case, the charging means a process of applying a high voltage (about 7,000V) to a charger to form negative (−) charges on a surface of a photoreceptor using corona discharge. The writing means a process of scanning a laser beam on the surface of the photoreceptor on which the negative (−) charges are formed to annihilate the negative (−) charges in a letter form so as to form a latent image. The developing means a process of sticking toner particles having a negative (−) component on the latent image portion of the surface of the photoreceptor. The transferring means a process of applying a predetermined transfer voltage to a transfer machine when a sheet passes between the photoreceptor and the transfer machine to form positive (+) charges on a rear surface of paper so as to attract negative (−) toner particles formed on a surface of a drum in a paper direction. Next, the fusing means a process of applying appropriate heat and pressure to the toner formed on paper to completely fuse the toner. By subjecting to all the processes, the image is formed on the sheet and then output.

The image forming unit 230 may compare the number of strip information configuring the page with the number of received strip information and thus if it is determined that all the strip information is not received, use the received strip information depending on a user printing command received in the user interface unit 220 to perform a print. In detail, when the image forming unit 230 does not have all the strip information due to a loss of the printing data, the image forming unit 230 may receive the user printing command to perform the printing only using the received strip information to perform the printing.

The control unit 240 controls each component of the image forming apparatus 200. In detail, the control unit 240 detects the number of the plurality of strip information configuring the page based on the received unique information and detects the number of received strip information to compare the number of the plurality of detected strip information configuring the page with the number of received strip information, thereby determining whether all the strip information is received. In more detail, since the received unique information includes the information on the number corresponding to the number of strip information, the control unit 240 may detect a total number of strip information configuring the page based thereon.

The control unit 240 may detect the number of received strip information by increasing a counter number one by one every time the strip information received through the communication interface unit 210 is present and when an event corresponding to a predetermined condition is generated, may detect the number of received strip information by counting parameters indicating the strip information.

Here, for example, the unique information may be at least one of numbers sequentially allocated to the plurality of strip information, respectively, and positional information of the strip occupied on the page. The detailed description thereof will be described below with reference to FIG. 7.

The control unit 240 may detect the number of the plurality of strip information configuring the page based on any one of a final number among the numbers sequentially allocated to the plurality of strip information, respectively, and the number of parameters declaring the positional information of the strip occupied on the page. In detail, the control unit 240 may find out the largest final number among the sequentially allocated numbers to identify the plurality of strip information, respectively, as the unique information to detect the total number of strip information.

The control unit 240 may detect the kind or type of page description language as indicated in the header region. In detail, the header region of the printing data may identify the kind or type of page description language (PDL) that describes the page information and the header region of the printing data as being a PCLm format, and may include both of the PDF version (for example, "PDF-1.4") information and the PCLm format version (for example, "PCLm-1.0") information. By detecting the header region, the control unit 240 can determine that the printing data needs to check whether all the strip information is received.

If it is determined that all the strip information is not received in the image forming apparatus 200, the control unit 240 may control the user interface unit 220 to represent an error that all the strip information is not received. In detail, the control unit 240 may control the user interface unit 220 to transmit the error that all the strip information is not received to the user interface unit 220 in a text message format or notify a user of the error in forms such as a change in a screen color and flickering of a warning light.

When the strip information sequentially transmitted to the image forming apparatus 200 is no longer received for predetermined time, the control unit 240 may determine whether all the strip information has been received. In detail, when a next strip information is not received from the time when the strip information is received for such a predetermine time, the control unit 240 may compare the number of strip information configuring the page with the number of strip information received until the present time to determine whether all the strip information is received. That is, despite waiting to receive next strip information for the predetermined time, if it is determined that the next strip information is not received, the control unit 240 may perform a process of determining the integrity of printing data without waiting, that is, process of determining whether all the strip information is received. Further, in the image forming apparatus 200 which may sense the communication state of the communication interface unit 210, when a communication disruption like communication interrupt is sensed, the control unit 240 may determine whether all the strip information is received. Further, when a user inputs a command to directly perform an inspection on whether all the strip information is included in the printing data received through the user interface unit 220, the control unit 240 may determine whether all the strip information is received.

The storage unit 250 may be implemented as a storage medium in the image forming apparatus 200 and an external storage medium, for example, a removable disk including a USB memory, a web server though a network, and the like. Further, the storage unit 250 may include a ROM, a RAM, a detachable/attachable memory card (for example, SD card, memory stick). Further, the storage unit 250 may include a non-volatile memory, a volatile memory, a hard disk drive (HDD), or a solid state drive (SSD).

Further, the storage unit 250 may store various kinds of firmwares, drivers, and software programs for performing an image forming function supported by the image forming apparatus 200. Further, the storage unit 250 may store the printing data received through the communication interface unit 210.

The image forming apparatus according to the one or more embodiments may determine whether the printing data to which images segmented to be streamable, e.g., into the strip, are sequentially transmitted are lost, thereby preventing the undesired image from being printed.

Figure 3:
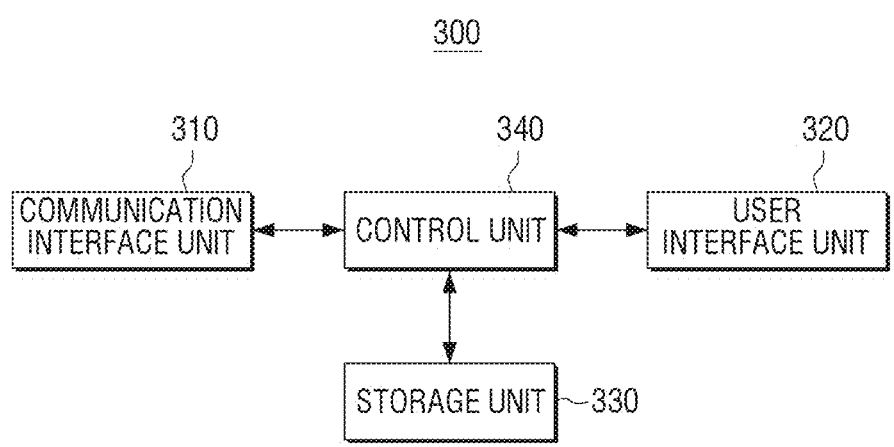
FIG. 3 is a block diagram of a printing control terminal device according to one or more embodiments of the present invention.

FIG. 3 is a block diagram of a printing control terminal device according to one or more embodiments of the present invention.

A printing control terminal device 300 may include a communication interface unit 310, a user interface unit 320, a storage unit 330, and a control unit 340, for example.

The communication interface unit 310 communicates with at least one external apparatus. In detail, the communication interface unit 310 may perform communications through not only a local area network (LAN) and an Internet network, but also a universal serial bus (USB) port and a memory card slot. For example, the communication interface unit 310 may download a printing data file stored in a server to the printing control terminal device 300 through an Internet network depending on a user download command. Further, the communication interface unit 310 may load the printing data file recorded in a mobile storage medium to the printing control terminal device 300 using a disk drive and a USB port which may read the mobile storage medium.

Further, the communication interface unit 310 may render at least one page included in a file to receive a plurality of strip information including each image segmented into a plurality of regions and printing data including different unique information corresponding to the plurality of strip information, respectively. In detail, the communication interface unit 310 may sequentially receive the unique information and the plurality of strip information. Further, the communication interface unit 310 may not receive the printing data which are streamable by segmenting an image of a page but may receive the printing data which are compressed into one file and transmitted.

Further, the communication interface unit 310 may first receive, earlier than the unique information and the strip information, a header region identifying the kind or type of page description language (PDL) that describes the page information to be printed.

If it is determined that all the strip information is not included in the printing data stored in the storage unit 330, the communication interface unit 310 may transmit a signal requesting a retransmission of the plurality of strip information to the terminal apparatus, e.g., the mobile apparatus or the server that transmitted the printing data file, that transmitted the stored unique information and strip information.

The user interface unit 320 includes a plurality of function keys which enable a user to set or select various functions supported by the printing control terminal device 300 and may display various information provided from the printing control terminal device 300.

In particular, if it is determined that all the strip information configuring at least one page included in the stored printing data is not stored, the user interface unit 320 may display an error screen that the printing data are lost. In detail, the user interface unit 320 may notify a user of error detection in forms such as characters displayed on a pop-up window, a change in a screen color, and flickering of a warning light.

Further, the user interface unit 320 may be implemented by combining a monitor with a mouse and may also be implemented as an apparatus in which an input and an output are implemented together like a touch screen. In this case, the user interface unit 320 may be configured by stacking a touch sensing unit and a display unit. Here, the touch sensing unit may be implemented as a touch sensor which may sense the user touch and a proximity sensor which may sense the proximity of the user touch. Further, the display unit may be implemented as an LCD panel, and the like which may display various screens such as a wallpaper including various icons, a web browsing screen, an application execution screen, a screen reproducing various kinds of contents like moving pictures, and pictures, and a user interface screen.

The storage unit 330 may render at least one page included in a file to store a plurality of strip information including each image segmented into a plurality of regions and printing data including different unique information corresponding to the plurality of strip information, respectively. In detail, the printing data downloaded or loaded from the outside through the communication interface unit 310 may be stored in the storage unit 330.

The storage unit 330 may include a ROM, a RAM, a detachable/attachable memory card (for example, SD card, memory stick) from and to the printing control terminal device 300. Further, the storage unit 330 may include a non-volatile memory, a volatile memory, a hard disk drive (HDD), or a solid state drive (SSD). Further, the storage unit 330 may store an operating system program for driving the printing control terminal device 300, a driver, an application program, a BIOS program, or the like.

The control unit 340 controls each component of the printing control terminal device 300. In detail, the control unit 340 detects the number of the plurality of strip information configuring the page based on the unique information stored in the storage unit 330 and detects the number of stored strip information to compare the number of the plurality of strip information configuring the page with the number of stored strip information, thereby determining whether all the strip information is included in the printing data. In more detail, the unique information included in the page information of the printing data includes different unique information of the number corresponding to the number of strip information and therefore the total number of strip information configuring the page may be detected based thereon.

The number of strip information included in the printing data may be detected by increasing a counter number one by one to correspond to the number of strip information by reading a region in which the strip information is described.

The control unit 340 may detect the number of the plurality of strip information configuring the page based on any one of a final number among the numbers sequentially allocated to the plurality of strip information, respectively, and the number of parameters declaring the positional information of the strip occupied on the page. In detail, the control unit 340 may find out the largest final number among the sequentially allocated numbers to identify the plurality of strip information, respectively, as the unique information to detect the total number of strip information.

The control unit 340 may detect a kind or type of page description languages identified in the header region. In detail, the header region of the printing data may identify the kind or type of page description language (PDL) that describes the page information and the header region of the printing data as being a PCLm format, and may include both of the PDF version (for example, "PDF-1.4") information and the PCLm format version (for example, "PCLm-1.0") information. From this, the control unit 340 may detect the header region to determine whether all the strip information is received.

If it is determined that all the strip information is not included in the printing data stored in the storage unit 330, the control unit 340 may control the user interface unit 320 to represent the error that all the strip information is not received. In detail, the control unit 340 may control the user interface unit 320 to transmit the error that all the strip information is not received of the user interface unit 320 in a text message format or notify a user of the error in forms such as a change in a screen color and flickering of a warning light.

When a user inputs a command, for example, to perform an inspection on whether all the strip information is included in the printing data received through the user interface unit 320, the control unit 340 may perform an operation to determine whether all the strip information is received.

The printing control terminal device 300 according to one or more embodiments may inspect whether there is a loss of strip information in the printing data downloaded or newly made, thereby avoiding the unnecessary operation.

Figure 4A:
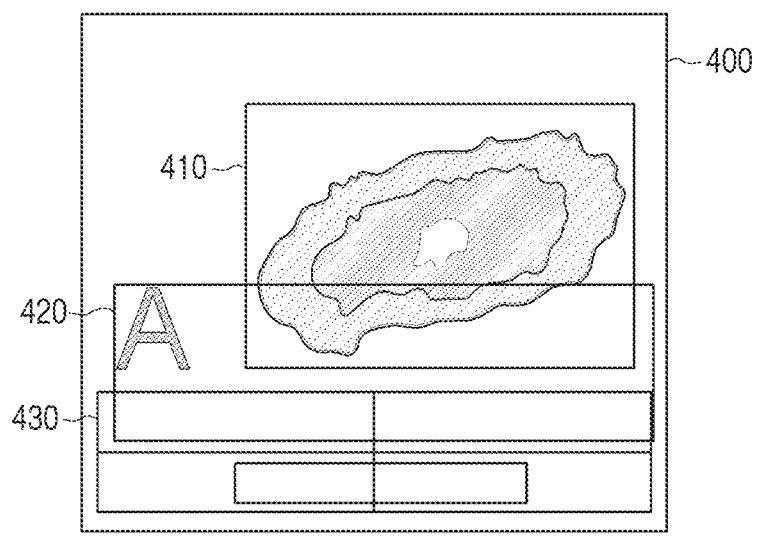
FIGS. 4A and 4B are diagrams for describing an object in a PDF format and a strip in the PCLm format.
Figure 4B:
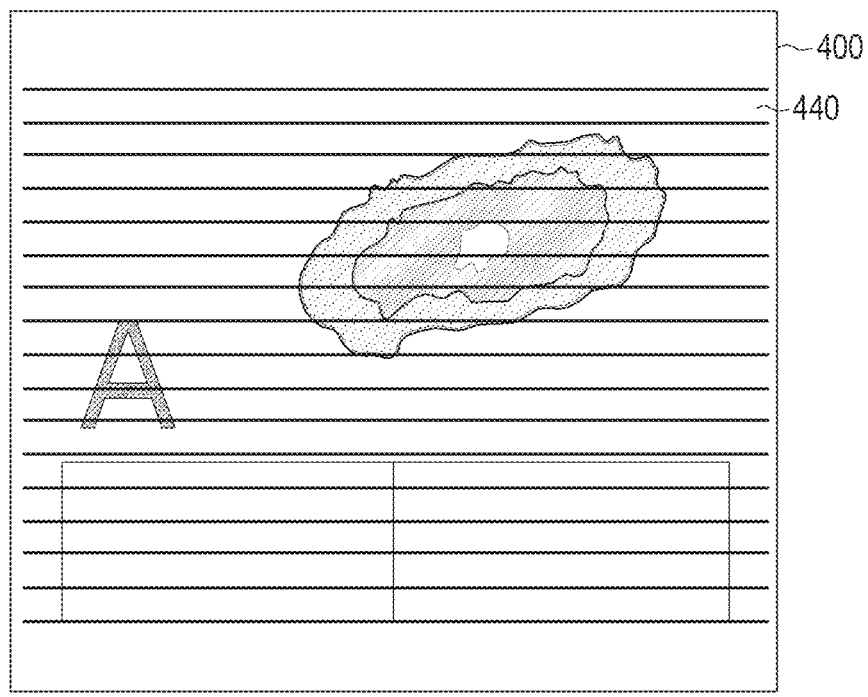

FIGS. 4A and 4B are diagrams for describing an object according to the PDF format and a strip according to the PCLm format.

FIG. 4A visually illustrates an interface between objects configuring a page of a PDF file. In detail, objects configuring a page 400 include a picture 410, a character 420, and a table 430, in which respective objects 410, 420, and 430 occupy different regions and positions on the page.

Meanwhile, an image illustrated in FIG. 4B has the whole image of the same page as FIG. 4A, but the picture 410, the character 420, and the table 430 of FIG. 4A, respectively, do not demonstrate the independent position and region but the whole image in which all the object regions of the page are merged is horizontally segmented by a predetermined width. Herein, a string of image unit which is segmented as described above is called a strip (or swath).

In the PCLm format based on the PDF grammar, as the object of the page could be described as a strip, the detailed description of the present invention differentiates between the 'strip' of the PCLm format and the object of the PDF format, e.g., in which images of all the pages may be segmented into lines, so that an image unit making up the page in the PCLm format is called a strip.

In conclusion, in FIGS. 4A and 4B, the image of the same page 400 is formed but the unit configuring the respective illustrated page is different between the objects 410, 420, and 430 and the strip 440.

Figure 5:
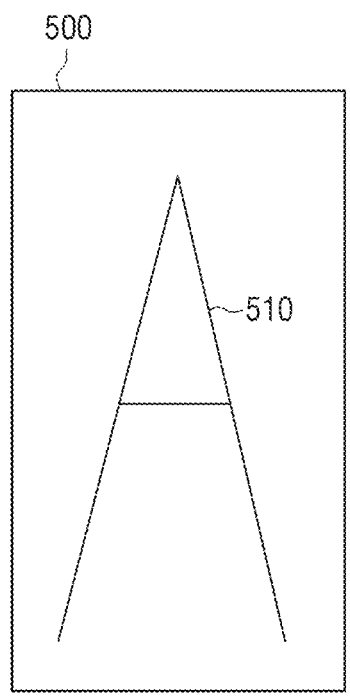
FIG. 5 is a diagram illustrating an appearance in which one page is segmented into a strip.
Figure 5:
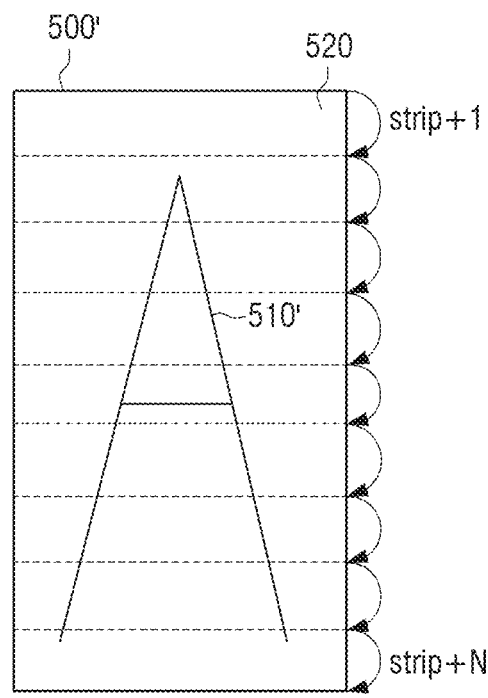

FIG. 5 is a diagram illustrating an appearance in which one page is segmented into a strip.

FIG. 5 illustrates a whole image (1) which configures one page and an image (2) which is segmented into strips which configure the one page. In a page 500, a character "A" 510 occupies the whole page as an object region. By segmenting a region of the whole object 510' included in a page 500' into a predetermined width depending on the PCLm, the page may be segmented into N strips 520 like image (2).

By segmenting the object included in the page into a strip form, a large object included in a page is not transmitted at one time but data streaming, transmitting a strip from the top of the page toward the bottom of the page, one by one may be made.

The data transmission of the streaming form may be sequentially made by processing only the strip, which is segmented small, in an arranged order without referring to a complicated programming grammar, e.g., by an apparatus like a mobile device in which a memory or a processing speed is limited, thereby simply and lightly performing the printing process.

Figure 6A:
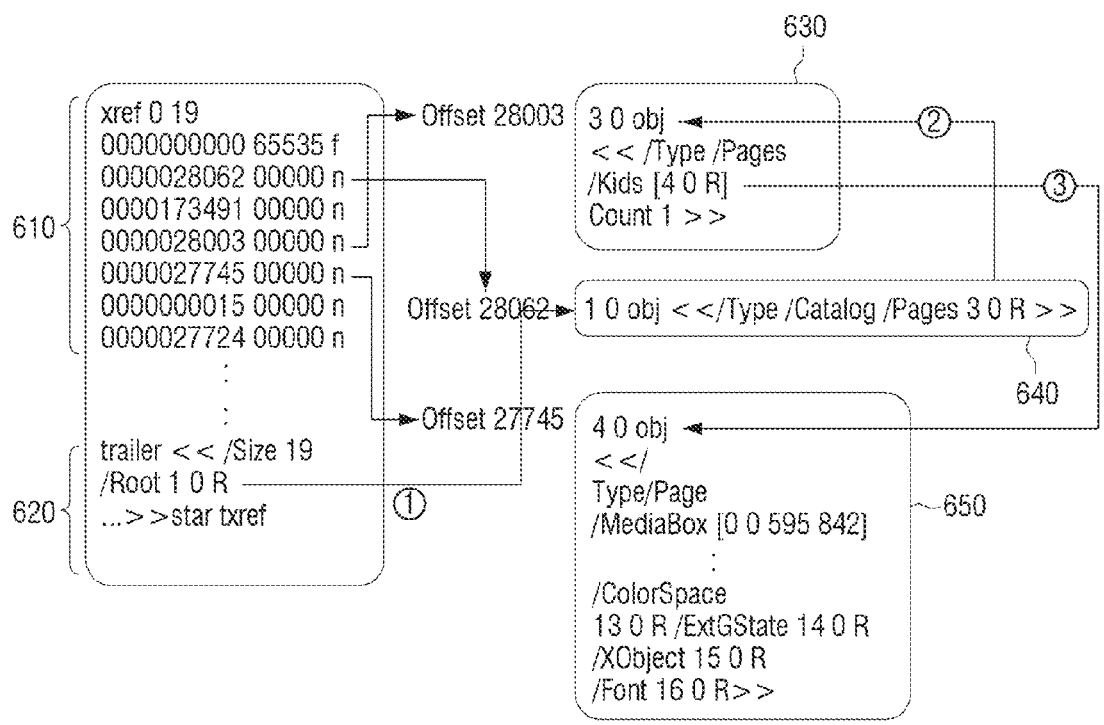
FIGS. 6A and 6B are diagrams for describing an object reference type of printing data described in the PDF format and the PCLm format.
Figure 6B:
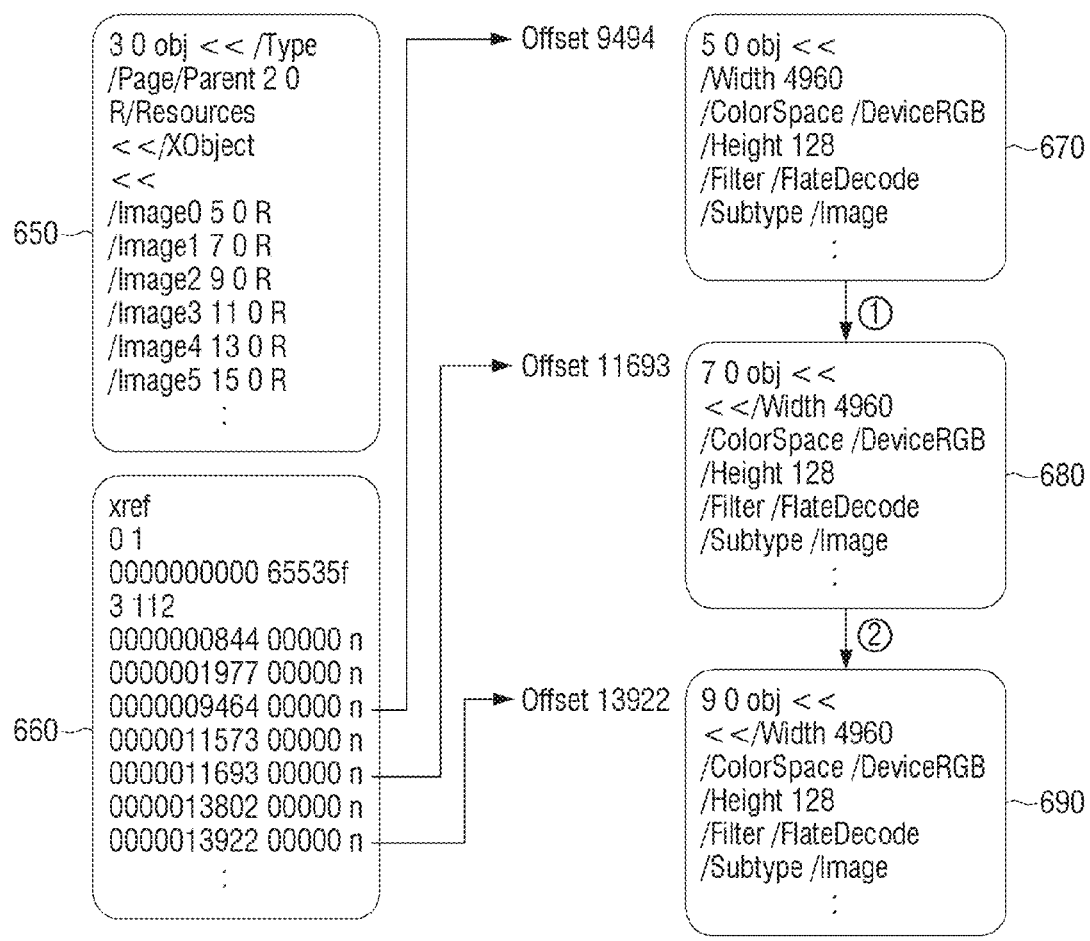

FIGS. 6A and 6B are diagrams for describing an object reference type of printing data described according to the PDF and PCLm formats, respectively.

Referring to FIG. 6A, the PDF file includes a cross reference table region 610, a trailer region 620, and object regions 630, 640, and 650.

The cross reference table region 610 has positional information of an object, such that inconvenience of reading all data for finding out a specific object may be avoided and a random access may be made by referring to the positional information described in the table. In detail, it may be appreciated that the cross reference table region 610 may be recognized from xref which is a cross reference table keyword and includes 19 objects. It may be appreciated that an object which is not used in a next string is 0 and an empty entry which is not used is f. Position offsets of each object corresponding to a currently used entry n from the subsequent next string are arranged.

The trailer region 620 includes the positional information of the cross reference table and the positional information of several special objects for reading the PDF file and reading the PDF file needs to start from the trailer region 620. In detail, the trailer region 620 may be recognized from a keyword trailer, the number of entries is 19 in the cross reference table from /Size 19, and No. 1 object is read by /Root 1 0 R. Although not illustrated, a figure next to keyword startxref indicates that the cross reference table is positioned at a position of byte corresponding to the figure from the beginning of the file.

Referring to the cross reference table, No. 1 object is positioned at offset 28062 by the /Root 1 0 R. It may be appreciated that a catalog object is described in 1 0 obj 640. Further, referring to the cross reference table to find out No. 3 object describing a page, it may be appreciated by /Pages 3 0 R described in the 1 0 obj 640 that the No. 3 object is positioned at offset 28003. It may be appreciated that one page (Count 1) is present in 3 0 obj 630 and a child object describing page 1 is No. 4. Referring to the cross reference table to find out No. 4 object, it may be appreciated based on /Kids [4 0 R] that No. 4 object is positioned at 27745. It may be appreciated that a MediaBox entry in a page object in 4.0 obj 650 occupies square interface coordinates of [0 0 595 842] indicating a position and a size on a page. In addition, a resource value positioned at the corresponding offset may be applied to the page by finding out an offset corresponding to a reference number next to /ColorSpace, /ExtGState, /XObject, and /Font which are entries of a resource from the cross reference table.

As described above, the PDF file may represent an object configuring a page by a random access scheme referring to the cross reference table 610.

Referring to FIG. 6B, it may be confirmed that the PCLm file is described according to the grammar as the PDF. For example, although not illustrated, the PCLm file has the same structure as the PDF file. Here, each number is allocated to the page object region 650 in an order of 5, 7, 9, and 11 downward from strip image0 which is an external object and referring to a cross reference table 660, it may be confirmed that an offset is increased in a number order. That is, it may be appreciated that each strip is disposed in an order of numbers which are allocated from a head of a memory. Further, referring to object information 670, 680, and 690 corresponding to each offset, it may be confirmed that they have entry values of the same width /Width 4960 and the same height /Height 128.

As described above, even though the PCLm file does not refer to the cross reference table 660 which is positioned at the rear, the strip may be processed string by string in an order in which the strip is positioned in the PCLm file and thus the PCLm file may be processed much simpler than the PDF file.

Figure 7:
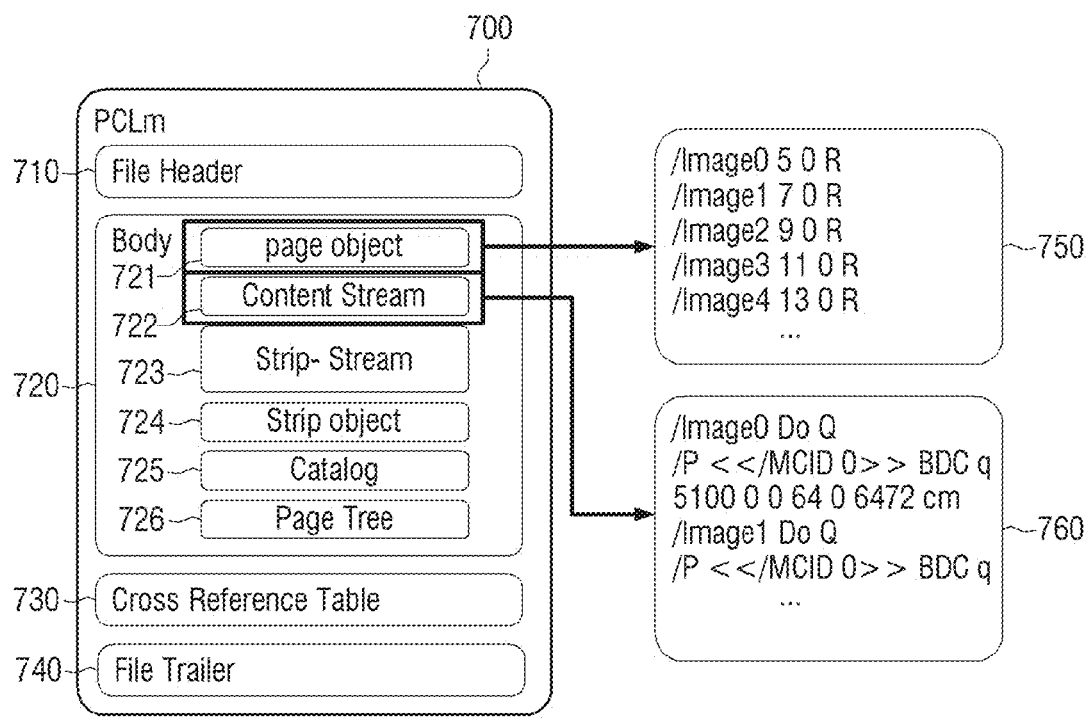
FIG. 7 is a diagram for describing a structure of the PCLm printing data.

FIG. 7 is a diagram for describing a structure of the PCLm printing data.

Referring to FIG. 7, a structure of a printing data 700 of a PCLm format includes a header region 710, a body region 720, a cross reference table region 730, and a trailer region 740. Further, the body region 720 includes a page object 721, a contents stream 722, a strip stream 723, a strip object 724, a catalog 725, and a page tree 726.

The header region 710 includes version information such as % PDF-1.4 and % PCLm-1.0.

The body region 720 includes data of a document which will be seen to a user.

A cross reference table region 730 includes positional information of all the objects of a document. Further, the cross reference table region 730 is a region described as a table to easily read an object positioned at an offset indicating positional information only by an object reference number.

The trailer region 740 includes information like a position at which the cross reference table region 730 starts and %%EOF description which informs an end of a file.

As described above, in one or more embodiments, the overall structure of the PCLm file may be the same as that of the PDF file, but is different from that of the PDF file in that the strip into which the image is equally segmented by a predetermined width is instructed as an object.

As described above, each strip name and an allocated number are arranged in the page object 721 included in the body region 720 (750) as described above and graphic parameter values applied to the strip are described in the contents stream 722 (760).

Binary data indicating the strip information are described in a strip-stream 723 and a strip-object 724 so as to be streamable.

A catalog 725 includes information which may refer to other objects defining a content included in a document. Further, the catalog 725 includes information declaring how to form an image of the document.

The page tree 726 includes information describing a node of a page having a tree structure.

As described above, it may be determined from the information described in the page object 721 and the contents stream 722 which are positioned ahead of the strip-stream region 723 whether the strip information is omitted or lost in the strip-stream region 723 describing the plurality of strip information in the body region 720.

Figure 8:
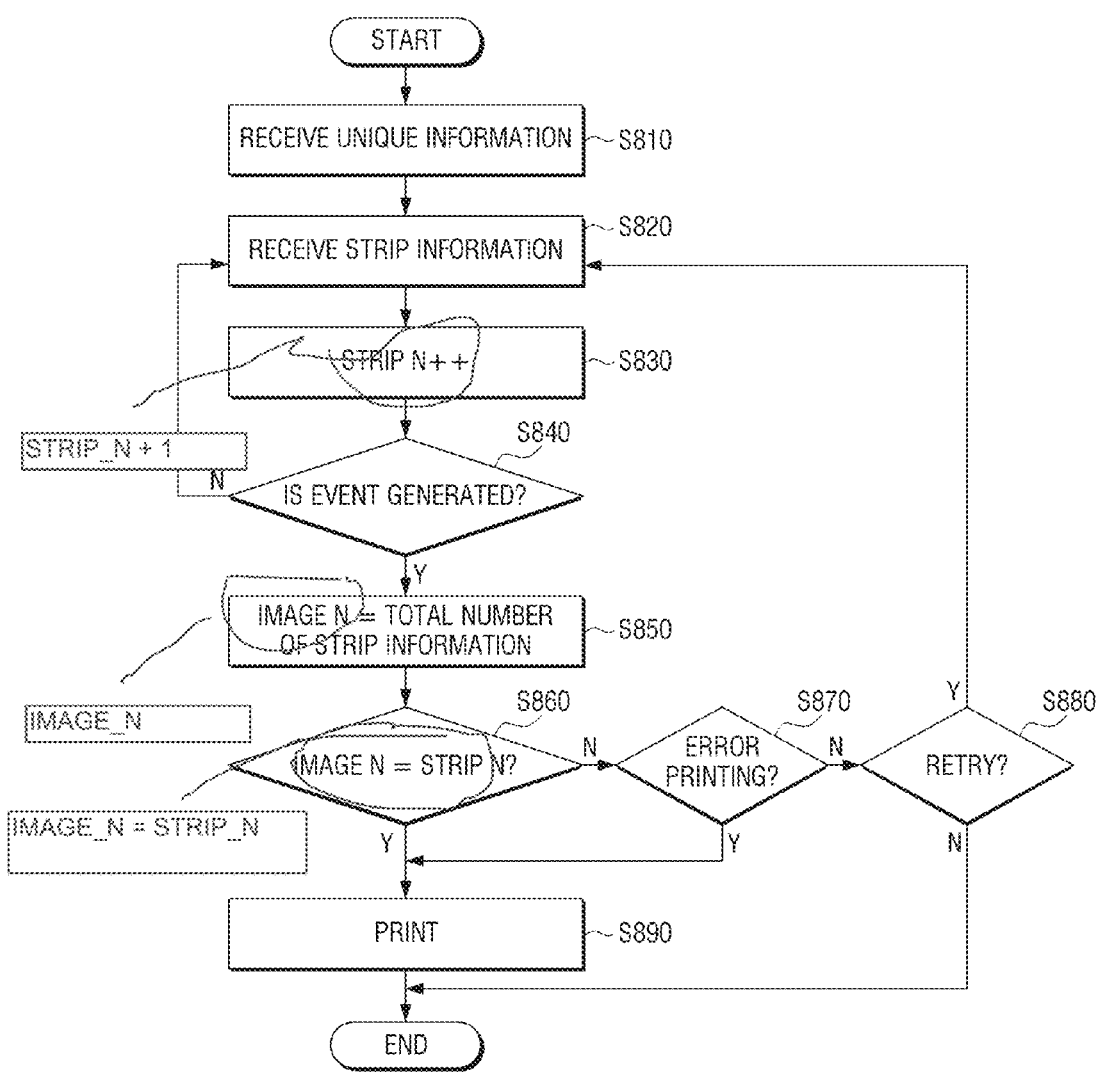
FIG. 8 is a flow chart of an image forming method according to one or more embodiments of the present invention.

FIG. 8 is a flow chart of an image forming method according to one or more embodiments of the present invention.

Referring to FIG. 8, the unique information is obtained from the printing data which include the plurality of strip information including each image segmented into a plurality of regions by rendering at least one page included in a file and the unique information having information on numbers allocated to the plurality of strip information, respectively (S810). Here, the numbers of the unique information are numbers which are sequentially allocated to the plurality of strip, respectively and may further include the positional information of the strip occupied on the page.

Next, the plurality of strip information which is sequentially transmitted is received (S820). Further, a counter for the number of strip information received may be increased one by one every time there is the received strip information (S830).

Further, it is determined whether a predetermined event is generated (S840). Here, the predetermined event may correspond to the case in which the next strip information is not received for a predetermined time or a communication disruption occurs.

When the predetermined event condition is not satisfied (S840, N), the next strip information which is sequentially transmitted is received (S820). However, when the predetermined event condition is satisfied (S840, Y), the number of the plurality of strip information configuring the page is detected based on the received unique information (S850).

Next, the total number of detected strips is compared with the number of received strips (S860). In detail, it may be determined by determining whether a variable Image_N indicating the total number of strip information agrees with a variable Strip_N indicating the number of received strips whether all the strips are received.

As the comparison result, if it is determined that all the strip information is received (S860, Y), the printing is performed (S890). However, if it is determined that all the strip information is not received (S860, N), the error information that all the strip information is not received is notified to the user and a user may be asked whether to perform the printing using only the received strip information (S870). If a user issues an error printing command to print incomplete printing data using only the received strip information as a response to the inquiry on whether to perform the printing (S870, Y), the error printing that some of the strip information is omitted is performed using the received strip information (S890). On the contrary, when the user cancels the printing without inputting the printing command (S870, N), the printing may immediately end and the user may be asked once again whether to retry the transmission of the strip (S880). When the user inputs a retry command as a response to a retry inquiry (S880, Y), the sequentially transmitted strip information is received again (S820), e.g., the next sequentially transmitted strip information may be received. When the user does not want to retry the transmission of the strip but cancels the printing job (S880, N), the image forming process ends.

The contents that the number of strip information configuring a page based on the unique information is detected, when the predetermined event is generated, are described above, which may be performed after the process (S810) receiving the unique information. Further, the image forming method may further include detecting a kind or type of page description language by first receiving the header region of the printing data.

As described above, a image forming method according to one or more embodiments may determine whether all the strip information is received, thereby selectively preventing an unnecessary printing operation to be performed for the lost printing data.

The above-mentioned image forming method may be performed by the configuration of the image forming apparatus 200 of FIG. 2 and may be performed by recording programs including computer readable code or instructions in a non-transitory computer readable record medium and enabling a processor to execute the programs, for example.

Figure 9:
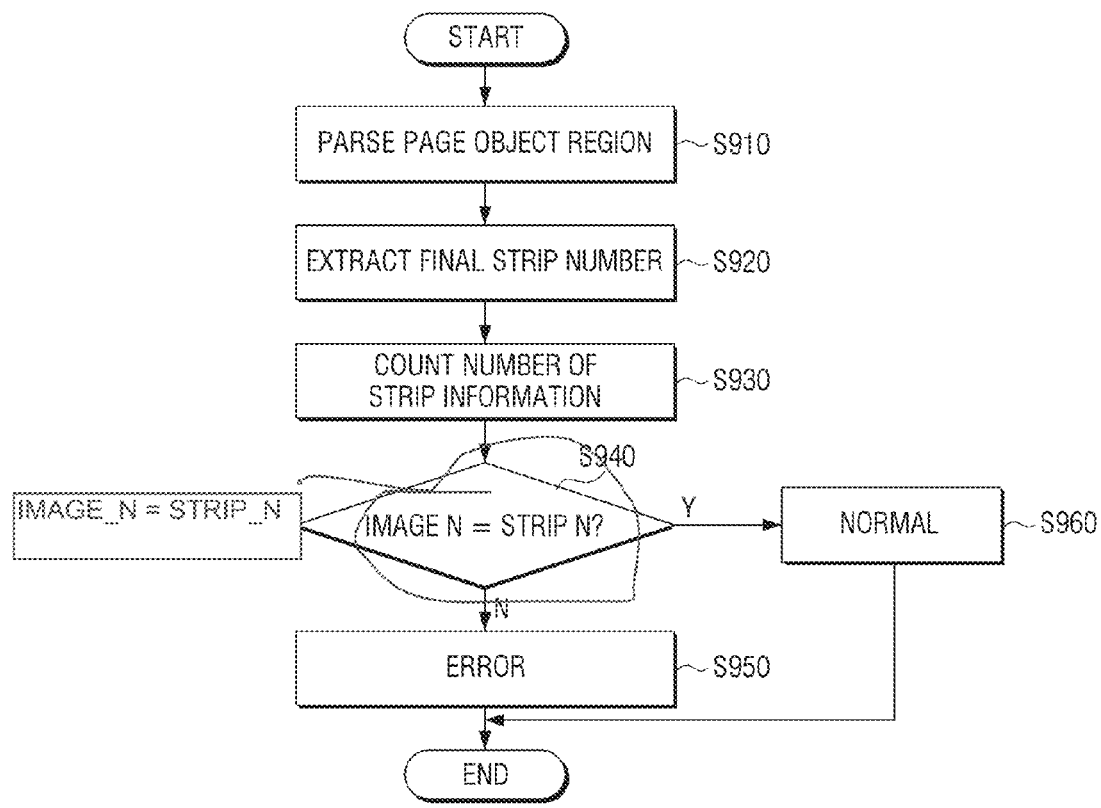
FIG. 9 is a flow chart showing a printing data inspecting method according to one or more embodiments of the present invention.

FIG. 9 is a flow chart showing a printing data inspecting method according to one or more embodiments of the present invention.

Referring to FIG. 9, when PCLm format printing data including a plurality of strip information, including each image segmented into a plurality of regions by rendering at least one page included in a file, and different unique information corresponding to the plurality of strip information are stored and the user inputs a command to start an inspection on whether there is no loss or omission of the stored PCLm format printing data, a page object region of the PCLm file is parsed (S910). Further, a final number, as the unique information sequentially allocated to each strip information described in the page object region, is extracted (S920).

Next, the number of strip information included in the body region of the stored PCLm file is counted (S930).

Further, it is determined whether the total number Image_N of strip information configuring the page based on the extracted final number disagrees with the number Strip_N of counted strip information in S930 (S940).

The case in which the total number of strip information and the number of counted strip information disagree with each other by comparison (S940, N) may be determined as the error that the strip is omitted in the PCLm file (S950).

On the contrary, the case in which the total number of strip information and the number of counted strip information agree with each other by comparison (S940, Y) may be determined as the normality that all the strip information is included (S960).

The foregoing procedure describes a process of counting the number of strip information included in the PCLm file (S930) and a process of determining the total number of strip information (S920), but an order thereof may be reversed at the time of implementation. Further, when the error is determined as the error that the strip is omitted in the PCLm file, the printing data inspecting method may further include notifying a user of the error.

In particular, the foregoing embodiment describes that the number of strip information configuring the page is detected by parsing the page object region but the number of strip information configuring the page may be detected based on the number of information described in the contents stream region by parsing the contents stream region. Further, the printing data inspecting method may further include checking of preventing the strip information from being omitted at the time of detecting the number of strip information configuring the page by parsing both of the two regions.

According to a printing data inspecting method according to one or more embodiments, it is possible to avoid the performance of the unnecessary printing job by performing a previous inspection on whether there is no omission of the printing data prior to printing the PCLm file.

Such an above-mentioned printing data inspecting method may be performed by the configuration of the printing control terminal device 300 of FIG. 3, for example, and may be performed by recording programs including computer readable code or instructions in a non-transitory computer readable record medium and enabling a processor to execute the programs, for example.

Figure 10:
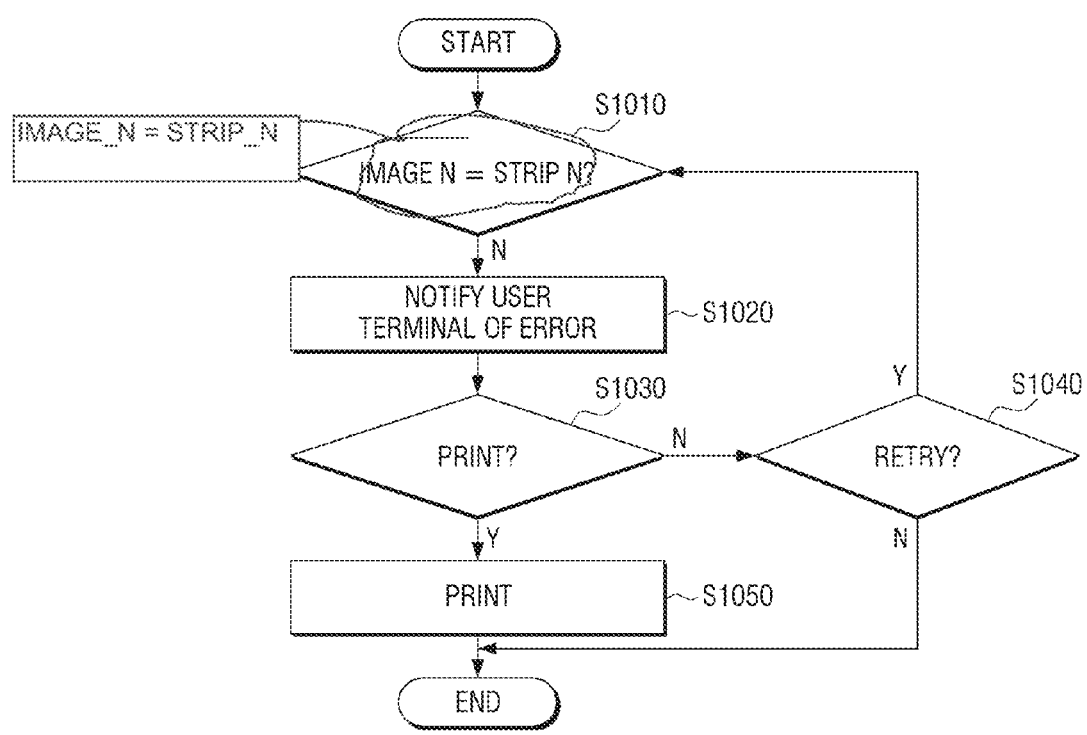
FIG. 10 is a flow chart illustrating a processing method, e.g., at a time of an error determination, according to one or more embodiments of the present invention.

FIG. 10 is a flow chart illustrating a processing method, e.g., at the time of error determination, according to one or more embodiments of the present invention.

Referring to FIG. 10, the image forming apparatus 200 compares the total number Image_N of strips configuring the page detected based on the unique information with the calculated number Strip_N of strips (S1010). As the comparison result, in the case of the disagreement, the image forming apparatus 200 notifies the user terminal transmitting the unique information and the strip information of the error that all the strips configuring the page are not included (S1020).

Next, the image forming apparatus 200 asks the user whether to print the printing data in which the strip information is omitted (S1030). The method of asking whether to perform the printing may be a method of displaying an interface window asking whether to perform the printing when an application installed in the user terminal apparatus receives the error notification. Alternatively, a user terminal can access the image forming apparatus 200 using the web browser application and display the interface window of a web page type provided by the image forming apparatus 200.

When a command to print the printing data in which the strip information is omitted/lost is input from the user terminal (S1030, Y) in response to the inquiry asking whether to perform the printing (S1030), the image forming apparatus 200 may perform the printing (S1050).

Meanwhile, when a command to inhibit the printing of the printing data in which the strip information is omitted/lost is input from the user terminal (S1030, N), it is asked whether to retry the transmission of the printing data (S1040).

When the printing data are transmitted by inputting a command to retry the transmission of the printing data from the user terminal (S1040, Y), the following procedure is performed by again comparing the total number of strip information based on the unique information with the number of received strip information (S1010).

In the case in which the printing is canceled without the user terminal retrying the transmission of the printing data (S1040, N), the processing method ends.

According to a processing method, e.g., at a time of an error determination, according to one or more embodiments, if the user wants, even the lost printing data may be adaptively printed and normal image printing may be performed by retrying the transmission of the printing data.

Figure 11:
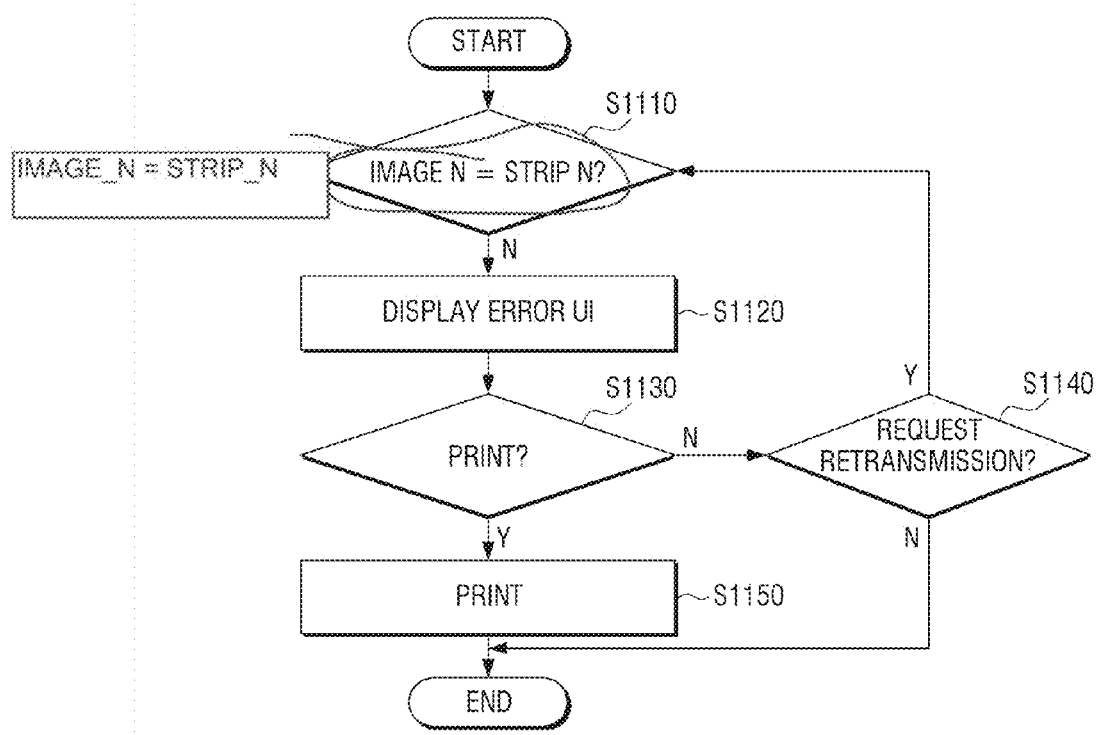
FIG. 11 is a flow chart illustrating a processing method, e.g., at a time of an error determination, according to one or more embodiments of the present invention.

FIG. 11 is a flow chart illustrating a processing method, e.g., at the time of error determination, according to one or more embodiments of the present invention.

Referring to FIG. 11, the image forming apparatus 200 compares the total number Image_N of strips configuring the page detected based on the unique information with the calculated number Strip_N of strips (S1100). As the comparison result, in the case of the disagreement, the image forming apparatus 200 displays the error screen (user interface) that all the strips configuring the page are not included on the user terminal transmitting the unique information and the strip information (S1120). The error screen may be displayed as a text message or a symbol in a display region or may be displayed as a change in color or flickering of light of a state display lamp.

Next, the image forming apparatus 200 displays a screen which asks the user whether to print the printing data in which the strip information is omitted (S1130).

When a command to print the printing data in which the strip information is omitted/lost is input to the image forming apparatus 200 in response to the inquiry (S1130) asking whether to perform the printing (S1130, Y), the image forming apparatus 200 performs the printing and ends.

Meanwhile, when a command to inhibit the printing of the printing data in which the strip information is omitted/lost is input to the image forming apparatus 200 (S1130, N), it is asked whether to retry the transmission of the printing data (S1140).

The user inputs a command to request the retransmission of the printing data of the image forming apparatus 200 (S1140, Y) to transmit the retransmission request command to the terminal apparatus and when the terminal apparatus again transmits the printing data in response thereto, the total number of strip information based on the unique information is compared with the number of received strip information (S1110) to perform following procedures.

In the case in which the printing is canceled without retrying the transmission of the printing data from the image forming apparatus 200 (S1140, N), the processing method ends.

According to a processing method, e.g., at a time of an error determination, according to one or more embodiments, if the user wants, even such lost printing data may be adaptively printed and normal image printing may be performed by retrying the transmission of the printing data.

Figure 12:
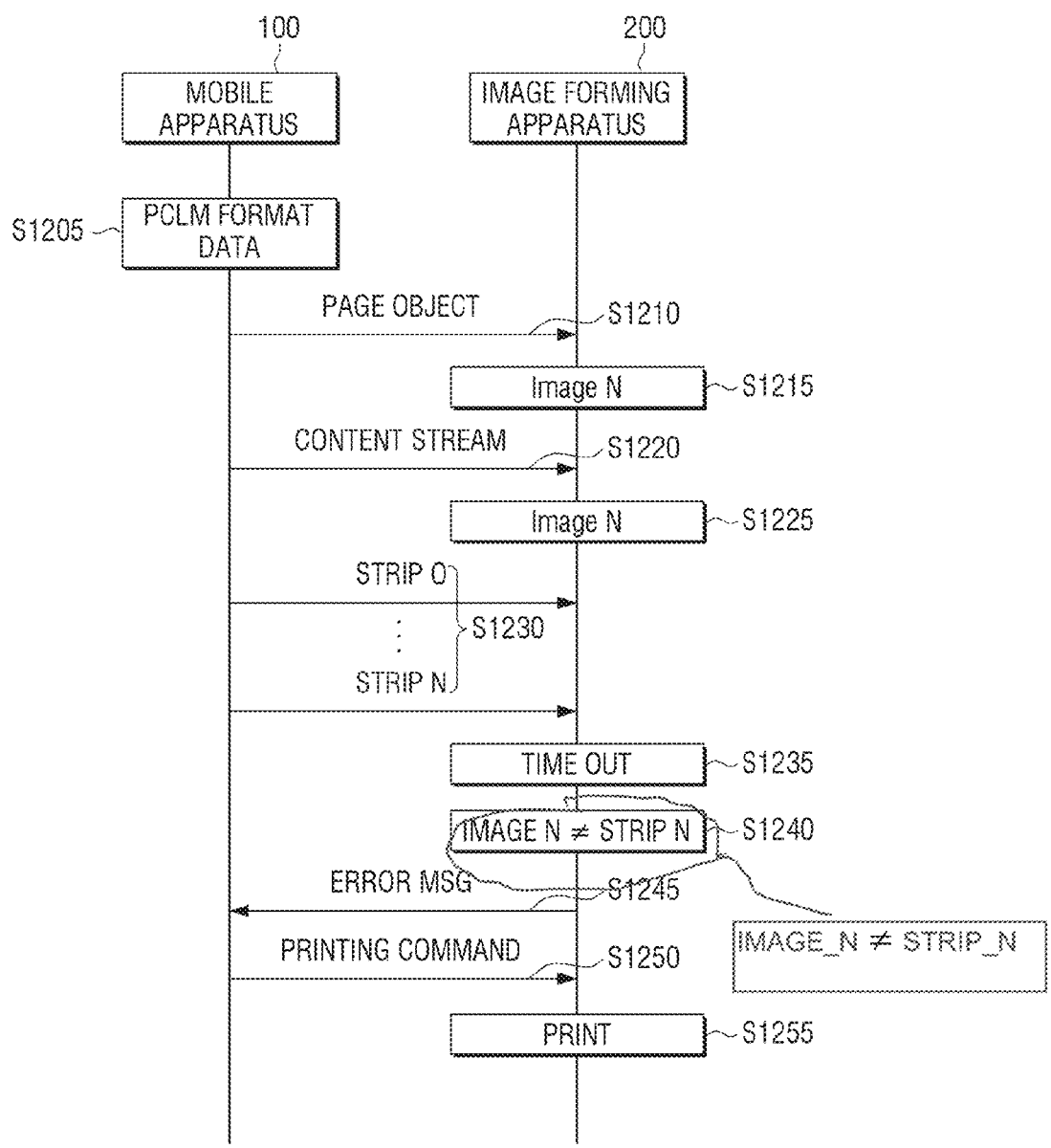
FIG. 12 is a sequence diagram for describing an example of data flow of an image forming system according to one or more embodiments of the present invention.

FIG. 12 is a sequence diagram for describing an example of data flow of an image forming system according to one or more embodiments of the present invention.

Referring to FIG. 12, an image forming system may be configured to include the mobile apparatus 100 and the image forming apparatus 200, for example.

The mobile apparatus 100 generates the printing data of the PCLm format (S1205). Further, a transmission of a page object region (S1210), a transmission of a content stream region (S1220), and a transmission of strip information Strip 0 . . . Strip N (S1230) are sequentially performed according to the structure of the PCLm file.

When receiving at least one of the page object region and the content stream region, the image forming apparatus 200 parses the corresponding region to detect the number Image_N of strips configuring the page based on the unique information on the plurality of strip information, respectively (S1215 and S1225).

Further, when the image forming apparatus 200 receives up to Strip_N from the mobile apparatus 100 and does not receive the next strip information for a predetermine time (S1235), the number of strip information received up to Strip_N is compared with the number of strip information configuring the detected page. As the comparison result, if it is determined that the number of strip information received up to Strip_N disagrees with the number of strip information configuring the detected page (S1240), the image forming apparatus 200 transmits an error message that all the strip information is not received to the mobile apparatus 100 (S1245).

The mobile apparatus 100 receiving the error message may provide an option asking the user whether to perform the printing based on the received error message and the user may input the printing command depending on the option and transmit the input printing command to the image forming apparatus 200.

Further, the image forming apparatus 200 receiving the printing command performs the printing based on the received strip information (S1255).

As described above, the image forming system according to one or more embodiments may determine whether all the strip information is received, thereby selectively preventing the image forming apparatus from performing a printing operation for lost printing data.

Meanwhile, all the components configuring one or more embodiments of the present invention may be described as coupled in one or operated, being coupled with each other, but the present invention is not necessarily limited to such embodiments. That is, depending on embodiment, all the components may be operated, being optionally coupled with each other within the scope of the present invention. Further, depending on embodiment, all the components may be each implemented in one independent hardware, but a part or all of each component may be selectively combined to be implemented as a computer program having a program module performing some functions or all the functions combined in one or a plurality of hardware. Codes and code segments configuring the computer program may be easily inferred by those skilled in the art. The computer program is stored in non-transitory computer readable media and thus is read by at least a processing device, e.g., a processor or computer, and as a result, one or more embodiments of the present invention may be implemented.

The non-transitory computer readable media may not be a medium that is designed to only temporarily store data therein, such as a register, a cache, a memory, or the like, but may be a non-transitory medium that semi-permanently stores data therein and is readable by a device. In detail, the foregoing computer readable code or programs may be stored in the non-transitory computer readable media such as a CD, a DVD, a hard disk, a Blu-ray disk, a USB, a memory card, an ROM, or the like.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image forming method using printing data that includes a plurality of strip information including a plurality of images, respectively, segmented into a plurality of strip regions by rendering at least one page from a file, and that includes unique information having information on respective number indicators allocated to the plurality of strip information, the image forming method comprising:
    receiving the unique information and the plurality of strip information;
    detecting an intended number of the plurality of strip information configuring the page based on the received unique information;
    determining whether all of an intended plurality of strip information configuring the page are received by comparing the intended number of the plurality of strip information with a detected number of the received plurality of strip information; and
    performing printing using the plurality of received strip information based on a result of the determining.

2. The image forming method as claimed in claim 1, wherein the unique information includes positional information occupied on the page by a strip of the plurality of strip regions.

3. The image forming method as claimed in claim 1, wherein in the detecting of the intended number of the plurality of strip information, the intended number of the plurality of strip information configuring the page is detected based on any of a final number among the number indicators sequentially allocated to the plurality of strip information and a detected number of parameters declaring positional information of the plurality of strip regions occupied on the page.

4. The image forming method as claimed in claim 1, wherein the printing data includes a header region identifying a type of page description language (PDL) in which the printing data describes information on the page to be printed, and
    in the determining, it is determined whether all of the intended plurality of strip information configuring the page are received based on the type of page description language included in the header region.

5. The image forming method as claimed in claim 1, further comprising:
    when the determining indicates that all of the intended plurality of strip information are not received, displaying an error that all of the intended plurality of strip information are not received.

6. The image forming method as claimed in claim 5, wherein the error is notified to a terminal apparatus that transmitted the unique information and the plurality of strip information.

7. The image forming method as claimed in claim 5, wherein in the displaying, a screen confirming whether to perform the printing using the received plurality of strip information is displayed, and
    in the performing of the printing, the printing is performed using the received plurality of strip information when a user inputs a printing command, corresponding to the screen.

8. The image forming method as claimed in claim 1, further comprising:
    when the determining indicates that all of the intended plurality of strip information are not received, requesting a retransmission of the intended plurality of strip information from a terminal apparatus that transmitted the unique information and the plurality of strip information.

9. The image forming method as claimed in claim 1, wherein in the determining, the determining is based on whether all of the intended plurality of strip information configuring the page are received within a predetermined time.

10. An image forming apparatus using printing data that includes a plurality of strip information including a plurality of images, respectively, segmented into a plurality of strip regions by rendering at least one page from a file, and that includes unique information having information on respective number indicators allocated to the plurality of strip information, the image forming apparatus comprising:
    a communication interface configured to receive the unique information and the plurality of strip information;
    a controller configured to detect an intended number of the plurality of strip information configuring the page based on the received unique information and compare the intended number of the plurality of strip information with a detected number of the received plurality of strip information to determine whether all of an intended plurality of strip information configuring the page are received; and
    an image former configured to perform printing using the received plurality of strip information based on a result of the determination by the controller.

11. The image forming apparatus as claimed in claim 10, wherein
    the unique information includes positional information occupied on the page by a strip of the plurality of strip regions.

12. The image forming apparatus as claimed in claim 10, wherein the controller detects the intended number of the plurality of strip information configuring the page based on any of a final number among the number indicators sequentially allocated to the plurality of strip information and a detected number of parameters declaring positional information of the plurality of strip regions occupied on the page.

13. The image forming apparatus as claimed in claim 10, wherein the printing data includes a header region identifying a type of page description language (PDL) in which the printing data describes information on the page to be printed, and
    the controller determines whether all of the intended plurality of strip information configuring the page are received based on the type of page description language included in the header region.

14. The image forming apparatus as claimed in claim 10, further comprising:
    a display,
    wherein
    when the controller determines that all of the intended plurality of strip information are not received, the display is controlled to display an error that all of the intended plurality of strip information are not received.

15. The image forming apparatus as claimed in claim 14, wherein the communication interface notifies a terminal apparatus, from which the communication interface received the unique information and the plurality of strip information, of the error.

16. The image forming apparatus as claimed in claim 14, wherein the display displays a screen confirming whether to perform the printing using the plurality of strip information received, and the image former performs the printing using the received plurality of strip information when a user inputs a printing command, corresponding to the screen.

17. The image forming apparatus as claimed in claim 10, wherein the communication interface unit transmits a signal requesting a retransmission of the intended plurality of strip information from a terminal apparatus that transmitted the unique information and the plurality of strip information that is received by the communication interface, based on the result of the determination by the controller.

18. The image forming apparatus as claimed in claim 10, wherein the controller determines whether all of the intended plurality of strip information configuring the page are received based on whether the plurality of strip information is received within a predetermined time.

19. A printing control terminal device connectable to at least one image forming apparatus, the printing control terminal device comprising:
   a storage configured to store printing data that includes a plurality of strip information including a plurality of images, respectively, segmented into a plurality of strip regions by rendering at least one page from a file, and that includes unique information having information on respective number indicators allocated to the plurality of strip information, and
   a controller configured to detect an intended number of the plurality of strip information configuring the page based on the unique information, to compare the intended number of the plurality of strip information with a detected number of the plurality of strip information included in the stored printing data, to determine, based on the comparison, whether all of an intended plurality of strip information configuring the page is included in the printing data, and to control, based on the determination, at least one of a transmission of an error message and a request of a retransmission of the plurality of strip information.

20. A non-transitory computer readable medium comprising computer readable code to control at least one processing device to implement a method using printed data that includes the plurality of strip information including a plurality of images, respectively, segmented into a plurality of strip regions by rendering at least one page from a file, and that includes unique information having information on respective number indicators allocated to the plurality of strip information, wherein the method includes:
   detecting an intended number of the plurality of strip information configuring the page based on the unique information;
   comparing the intended number of the plurality of strip information with a detected number of the plurality of strip information included in the printing data;
   determining whether all of an intended plurality of strip information configuring the page is included in the printing data based on the comparing; and
   based on the determining, performing at least one of an image forming operation using the plurality of strip information, transmitting an error message, and requesting a retransmission of the plurality of strip information.

* * * * *